United States Patent
Grau

(10) Patent No.: US 6,966,286 B2
(45) Date of Patent: Nov. 22, 2005

(54) METHOD AND DEVICE FOR EQUALIZING THE FILLING OF THE CYLINDERS OF A MULTI-CYLINDER INTERNAL COMBUSTION ENGINE

(75) Inventor: Ulrich Grau, Emskirchen (DE)

(73) Assignee: INA-Schaeffler KG, (DE)

(*) Notice: Subject to any disclaimer, the term of this patent is extended or adjusted under 35 U.S.C. 154(b) by 0 days.

(21) Appl. No.: 10/850,240

(22) Filed: May 20, 2004

(65) Prior Publication Data

US 2004/0211393 A1 Oct. 28, 2004

Related U.S. Application Data

(63) Continuation of application No. PCT/EP02/11733, filed on Oct. 19, 2002.

(60) Provisional application No. 60/333,351, filed on Nov. 26, 2001.

(30) Foreign Application Priority Data

Nov. 26, 2001 (DE) ................................ 101 57 616

(51) Int. Cl.[7] ................................................ F01L 1/34
(52) U.S. Cl. ................................. 123/90.15; 123/90.16
(58) Field of Search ........................... 123/90.15, 90.16

(56) References Cited

U.S. PATENT DOCUMENTS

| 2,410,660 A |   | 11/1946 | Howard |
|---|---|---|---|
| 2,934,052 A |   | 4/1960 | Longenecker |
| 4,714,057 A |   | 12/1987 | Wichart |
| 5,127,384 A |   | 7/1992 | Geringer |
| 5,255,637 A | * | 10/1993 | Schechter ................ 123/48 R |
| 5,377,654 A |   | 1/1995 | LoRusso et al. |
| 6,401,675 B1 | * | 6/2002 | Nakamura et al. ....... 123/90.15 |

FOREIGN PATENT DOCUMENTS

EP 0 833 043 4/1998

* cited by examiner

*Primary Examiner*—Thomas Denion
*Assistant Examiner*—Zelalem Eshete
(74) *Attorney, Agent, or Firm*—Charles A. Muserlian

(57) ABSTRACT

A method for equalizing the filling of cylinders of a multi-cylinder internal combustion engine (14) comprising a fully variable mechanical valve train (20) having an adjusting shaft (1) that controls the valve lift of the inlet valves of a cylinder bank and can be rotated together with its rotationally fixed adjusting cam (2) by an electromechanical actuator (3) whereby an equalization of the filling of the individual cylinders is achieved by the fact that filling-dependent engine data are measured by a sensor (16) while the engine (14) is running and are processed using suitable software in a control device (15) into signals with which the actuator (3) rotates the adjusting shaft (1) selectively for each cylinder in keeping with the opening phase and thus regulates the lift and the time cross-section of the individual inlet valves and, as a consequence, also the filling of the individual cylinders to a desired set value.

8 Claims, 3 Drawing Sheets

METHOD AND DEVICE FOR EQUALIZING THE FILLING OF THE CYLINDERS OF A MULTI-CYLINDER INTERNAL COMBUSTION ENGINE

This application is a Continuation of PCT/EP02/11733 filed Oct. 19, 2002.

This appln. claim the benefit of 60/333,351 filed Nov. 26, 2001.

DESCRIPTION

1. Field of the Invention

The invention concerns a method and a device for equalizing the filling of the cylinders of a multi-cylinder internal combustion engine, particularly according to the preamble of claims 1 and 8.

2. Background of the Invention

DE 100 06 018 A1 discloses a multi-cylinder internal combustion engine that comprises a fully variable mechanical valve train having an adjusting shaft that controls the valve lift of all the inlet valves of a cylinder bank and can be rotated together with its rotationally fixed adjusting cam by an electromechanical actuator.

In internal combustion engines with fully variable mechanical valve trains, low idle running results in valve lifts of a few tenths of a millimeter. Manufacturing tolerances in the valve train components therefore have a relatively strong effect and lead to differing valve lifts. Particularly at low idle running and in idling-proximate speed and load ranges, these differing valve lifts lead in part to considerable filling differences between the cylinders and thus also to erratic engine running.

Filling differences caused by valve lift differences of a few hundredths of a millimeter are already perceptible. The situation is worsened by the fact that, due to the absence of driving noises, the passengers of a car can clearly register torsional vibrations and speed fluctuations of the engine at low idle running. Fortunately, however, with increasing engine speed and load, the optimum inlet valve lift required also increases rapidly. Thus, just above the idling speed and at mean engine loads, a valve lift deviation has hardly any effect on the smoothness of running of the engine.

One possibility of mastering the problem of tolerances in valve lifts is to classify valve train components in different tolerance groups. However, this method involves considerable input of time and work in the mounting of the cylinder banks. The same applies to the use of adjusting devices and compensation elements for compensating tolerances.

OBJECT OF THE INVENTION

The object of the invention is to provide a method of avoiding filling-dependent torsional vibrations in an internal combustion engine of the pre-cited type having a fully variable mechanical valve train, and more particularly of avoiding such vibrations at low idle running and in an idling-proximate load and speed range of the engine.

SUMMARY OF THE INVENTION

The invention achieves the above objects by implementing the features of claim 1. The acquisition of filling-dependent engine data on a running engine has the advantage that even effects, for example, of wear or of temperature-dependent length variations of the control components that only develop in the course of engine operation, or even effects extraneous to controlling, such as suction pipe vibrations, can be detected and taken into account in the leveling of the cylinder fillings. The data are immediately processed with suitable, fast control devices and are converted into adjusting movements of the electromechanical actuator. Due to the fact that the actuator rotates the adjusting shaft selectively for each cylinder in keeping with the opening phase, the equalization of the filling of the cylinders of a cylinder bank is regulated via the time cross-sections of the inlet valves.

The problem of obtaining a rapid adjustment of the adjusting shaft is made less critical by the fact that tolerance-dependent torsional vibrations of the engine occur primarily in the idling range.

Of further advantage are the shortened opening times of the inlet valves at these operational points with correspondingly long non-operation phases therebetween.

The deviations of the valve lifts from a set value can also be measured with a suitable equipment on a mounted cylinder bank before the engine is put into service. The measured deviations can be deposited as a characteristic diagram in the control device of the valve train or in the central engine control device. The correction of the tolerances selectively for each cylinder is then effected during engine operation on the basis of this characteristic diagram. This method only permits a one-time control of the filling of the cylinders and does not allow a regulation that also takes into account the changes that occur during engine operation.

The novel regulation of the filling of the cylinders can be realized without additional mechanical structures. All that is required is to equip the control device with additional functions and, if necessary, with an enhanced computer capacity, and provide a slight increase in the efficiency of the adjusting motor.

On the whole, cost and functional advantages are obtained over mechanical tolerance compensation methods such as selective mating of components.

In any case, the enhanced smoothness of running of the engine offers the advantage of cost reduction in the peripheral equipment of the engine. This is true, for example, for a two-mass flywheel or for the engine suspension and noise muffling.

In manufacturing, costs can be saved by allowing rougher tolerances in the valve train components because these tolerances can be compensated for by regulating the filling.

It is also of advantage that, for example, the torsional vibrations or the lambda value combined with the injected quantity or duration of injection of fuel or the signal of a knock sensor can serve for judging the filling of the individual cylinders, i.e. it is possible to have recourse to already available sensor signals. Torsional vibrations are a result of work cycles of different speeds and can be read off the marks on the periphery of the flywheel. Combined with calibrated injection nozzles, a high-resolution lambda probe permits conclusions as to the filling of the individual cylinders. The opening times of the inlet valves can be determined using a knock sensor by measuring solid-borne noise.

The torsional vibrations are utilized for the correction of the filling of the individual cylinders because adjusting curves are generated in the control device by appropriate software on the basis of the differences in duration of the work cycles of the individual cylinders. These adjusting curves are traced by the actuator selectively for each cylinder and in keeping with the opening phase and enable, via the adjusting shaft, appropriate corrections of the time cross-sections of the individual inlet valves and thus of the filling of the individual cylinders.

A particularly precise correction of the filling values is achieved by the fact that the equalization of the filling of the individual cylinders is performed in defined steps and over a large number of work cycles till, finally, the deviations lie below a defined limit threshold value.

A particularly fast correction of the filling values is achieved by the fact that the equalization of the filling-dependent differences in duration of the work cycles of the individual cylinders is effected using adjusting values that are stored in a characteristic diagram of the control device as a function, for example, of the difference in duration.

For an operation with an optimal correction of the filling, it is of advantage that the last-used adjusting values are stored in a non-volatile store of the control device when the engine is turned off and are then available at the next start of the engine.

An optimal adjustment of the filling even in extreme states of operation is achieved by the fact that the adjusting values for operational states like cold and hot starts and cold and hot operation of the engine are stored in a characteristic diagram of the control device.

The device required for implementing the method comprises a control device that is connected through a first electric line to a transmitter of signals of the internal combustion engine that are relevant to the cylinder filling, and through a second electric line to a driving motor of the actuator.

Normally, only one adjusting shaft together with the adjusting actuator is provided in the case of a four cylinder engine. With a view to deactivation of cylinders, it can be useful in the case of six or twelve cylinder engines, to group the cylinders into threes and provide each group with its own adjusting shaft and an associated actuator, so that these groups can become active by turns. In this way, half the cylinders can be deactivated at a time by setting zero lift, but all the cylinders would still remain at operating temperature.

BRIEF DESCRIPTION OF THE DRAWINGS

Further features of the invention will become obvious from the following description and the drawing in which examples of embodiment of the invention are illustrated schematically.

DETAILED DESCRIPTION OF THE DRAWINGS

Figures 1A, 1B:
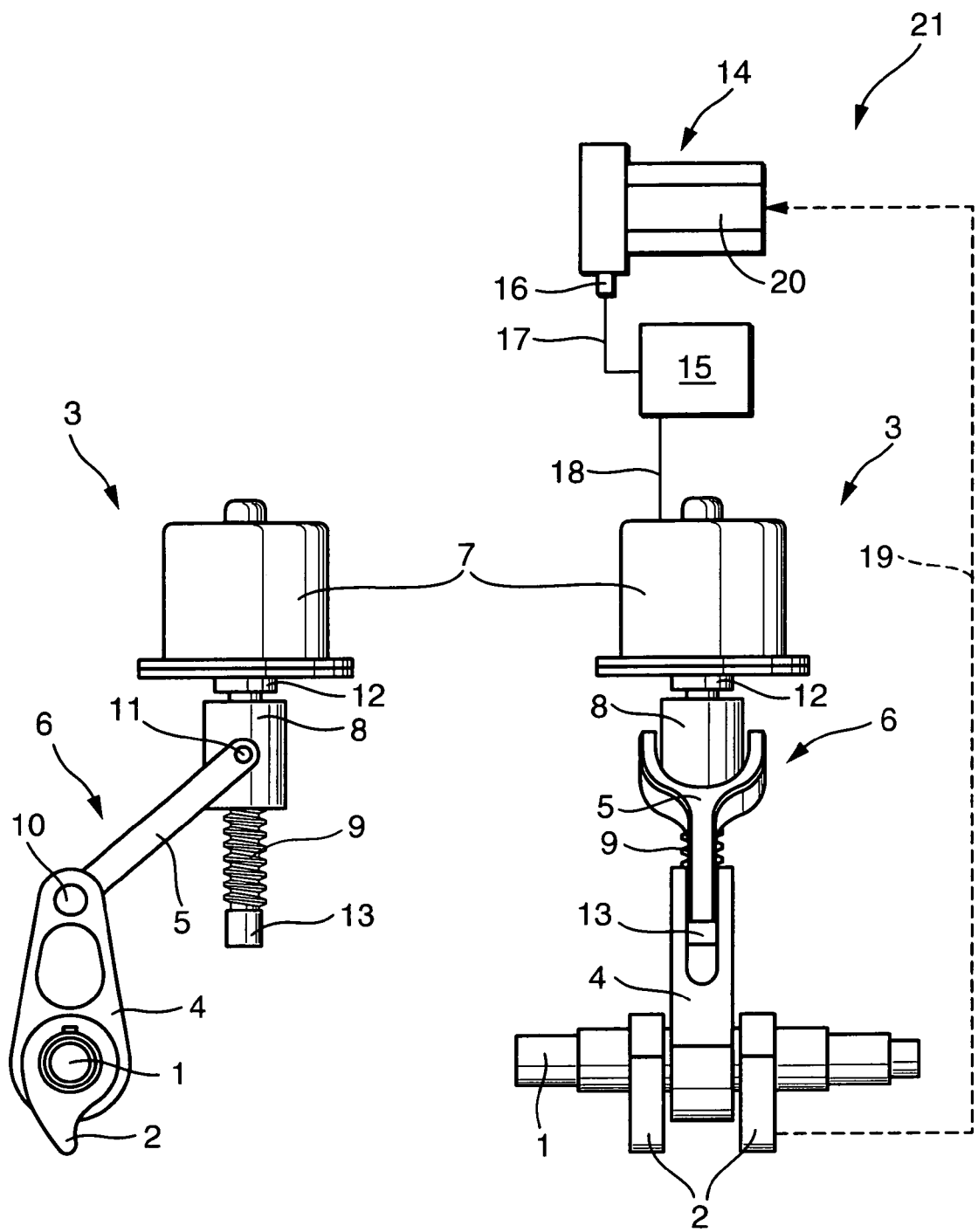
FIG. 1a is a side view of an electromagnetic actuator in axial direction of the adjusting shaft.
FIG. 1b is a side view of the actuator of FIG. 1a as seen in crosswise direction of the adjusting shaft, showing a wiring scheme of a device for equalizing the filling of the cylinders.

FIGS. 1a and 1b show an adjusting shaft 1 with adjusting cams 2 for a fully variable mechanical valve train, not shown, of a multi-cylinder internal combustion engine 14, and an electromechanical actuator 3 for the adjusting shaft 1.

The actuator 3 comprises an adjusting lever 4, a forked lever 5, a spindle drive 6 and an electromotor 7. The spindle drive 6 comprises a spindle nut 8 with a threaded spindle 9 guided therein.

The adjusting lever 4 is fixed against rotation to the adjusting shaft 1. The forked end of the adjusting lever 4 is connected to the forked lever 5 by a mounting pin 10.

The forked lever 5 and the spindle nut 8 are articulated on each other by two other mounting pins 11 having a common axis that extends through the center and the axis of the spindle nut 8. In this way, the spindle nut 8 is secured against rotation.

The threaded spindle 9 and an electromotor shaft 12 are made in one piece with each other. This excludes the need of a coupling which would otherwise be required between the threaded spindle 9 and the electromotor shaft 12, so that the actuator 3 has a compact, rigid and simple structure.

The electromotor shaft 12 comprises two bearings and the threaded spindle 9 comprises an additional support bearing 13. This latter bearing is required due to the high transverse forces transmitted by the forked lever 5 through the spindle nut 8 to the threaded spindle 9. All three bearings are mounted on the cylinder head, and one of them is configured as a fixed bearing.

Lash can be minimized in the spindle drive by configuring it with pre-stress which can be realized, for example, by using oversized rolling elements.

The low friction of the actuator permits the use of a low torque electromotor 7 that exerts only a low load on the vehicle network.

The multiplication ratio between the electromotor 7 and the adjusting shaft 1 is determined by the lengths of the adjusting lever 4 and the forked lever 5 as also by the pitch and angular position of the threaded spindle 9. With these relatively simple and thus low-cost mechanical components, a high reduction ratio can be achieved between the electromotor 7 and the adjusting shaft 1. This applies particularly to the final phase of the adjusting movement in which the forked lever 5 is approximately perpendicular to the threaded spindle 9 and effects a high multiplication ratio and, at the same time, requires a low drive torque.

The actuator 3 can be mounted in any desired longitudinal or angular position on the adjusting shaft 1 and thus be adapted to the installation conditions of the internal combustion engine 14.

The actuator 3 is characterized by a simple, rigid and compact structure. Due to a feeble lash, it achieves a high positional precision and, due to low friction, a high speed of adjustment with low load on the vehicle network.

This actuator is therefore particularly suited for use in a device 21 for implementing a method for equalizing the filling of the individual cylinders of the multi-cylinder internal combustion engine 14 shown in FIG. 1b. In addition to the existing actuator 3, the device 21 requires only a control device 15 that is connected through a first electric line 17 to a transmitter 16 that measures the torsional vibrations of the crankshaft, and through a second electric line 18 to the electromotor 7 of the actuator 3. The operative connection existing between the adjusting cam 2 and the variable mechanical valve train 20 in the installed state of the actuator 3 is indicated by the broken line 19.

The control device 15 can be a part of a central engine control device or be integrated into this, or it can be a special control device within the device 21. If necessary, the computer capacity and the functional range of this device must be enhanced.

The only additional apparatus required for the device is the transmitter 16 (already provided in some cases) and possibly a more efficient electromotor 7. No additional mechanical components are required.

Figure 2:
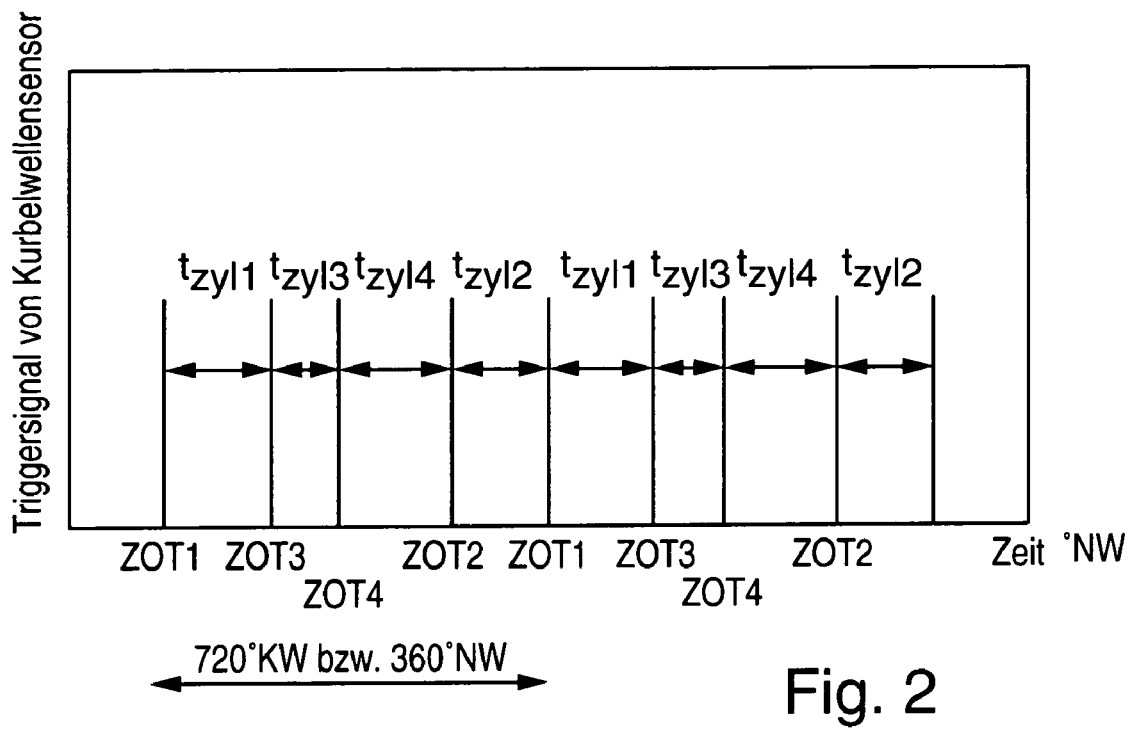
FIG. 2 is a diagram showing crankshaft signals for ignition points in the order of ignition of a four cylinder engine.

The torsional vibrations of the crankshaft of the internal combustion engine 14 are represented in a diagram of FIG. 2 along a time axis in degrees of cam angle shown as different time intervals between the trigger signals or ignition points ZOT of a four cylinder, four cycle engine in its order of ignition 1-3-4-2. The time interval between the ignition points ZOT corresponds to the duration of the respective work cycles that depends on the filling of the individual cylinders. Short work cycles correspond to a high filling with rapid combustion, long cycles to a low filling with sluggish combustion.

Figure 3:
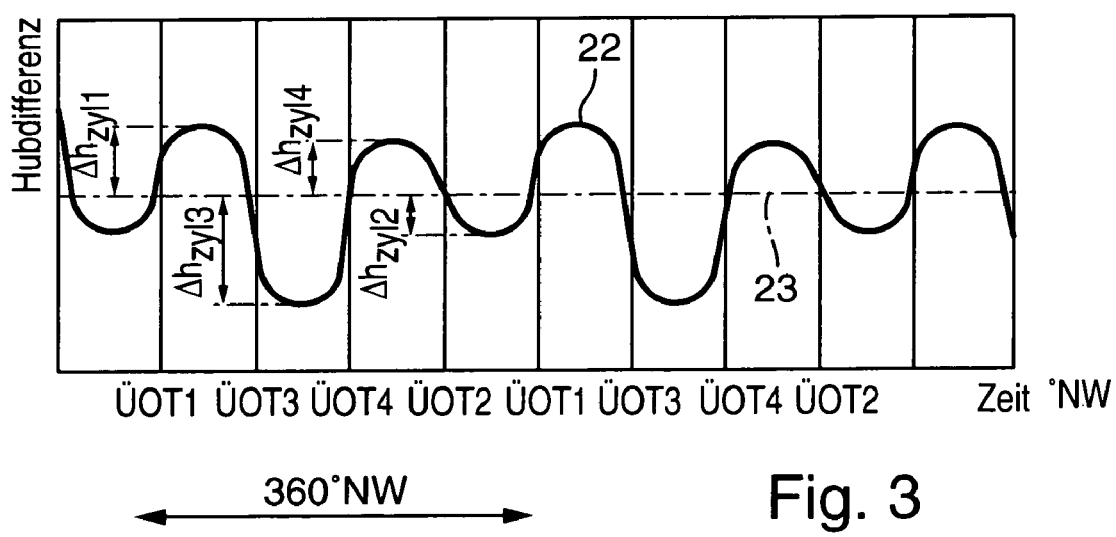
FIG. 3 shows an adjusting curve for the actuator based on FIG. 2 for correcting the valve lift of the inlet valves of a four cylinder engine.

The diagram shown in FIG. 3 is matched to the diagram of FIG. 2. The overlap dead centers ÜOT of the cylinders are plotted along the abscissa in the order of ignition 1-3-4-2 of the four cylinder, four cycle engine in degrees of cam angle. The differences in lift of the inlet valve lifts are plotted along the ordinate in relation to a line 23 that represents the mean inlet valve lift in the respective actual operational state. Adjusting curves 22 generated in the control device 15 on the basis of different work cycle durations by evaluation of the transmitter signals with adequate software are represented between the overlap dead centers ÜOT. The adjusting curves 22 counteract the tolerance-dependent differences in filling by correcting valve lift. In the case of cylinders with deficient filling, these curves extend to above the line 23 (for increasing valve lift), and in the case of cylinders with excessive filling, they extend to below this line (for decreasing valve lift).

The adjusting curves 22 are traced by the actuator 3 in keeping with the phases. In this way, each valve lift and the respective inlet time is adjusted. It is not so much an identical valve lift that is of prime importance for achieving a uniform filling but an identical time cross-section of the inlet valves.

It is also possible to attain the values of the adjusting curves 22 gradually in defined steps over a larger sequence of operating cycles till, finally, the differences in duration of the work cycles of the individual cylinders lie below a defined limit threshold value.

Figure 4:
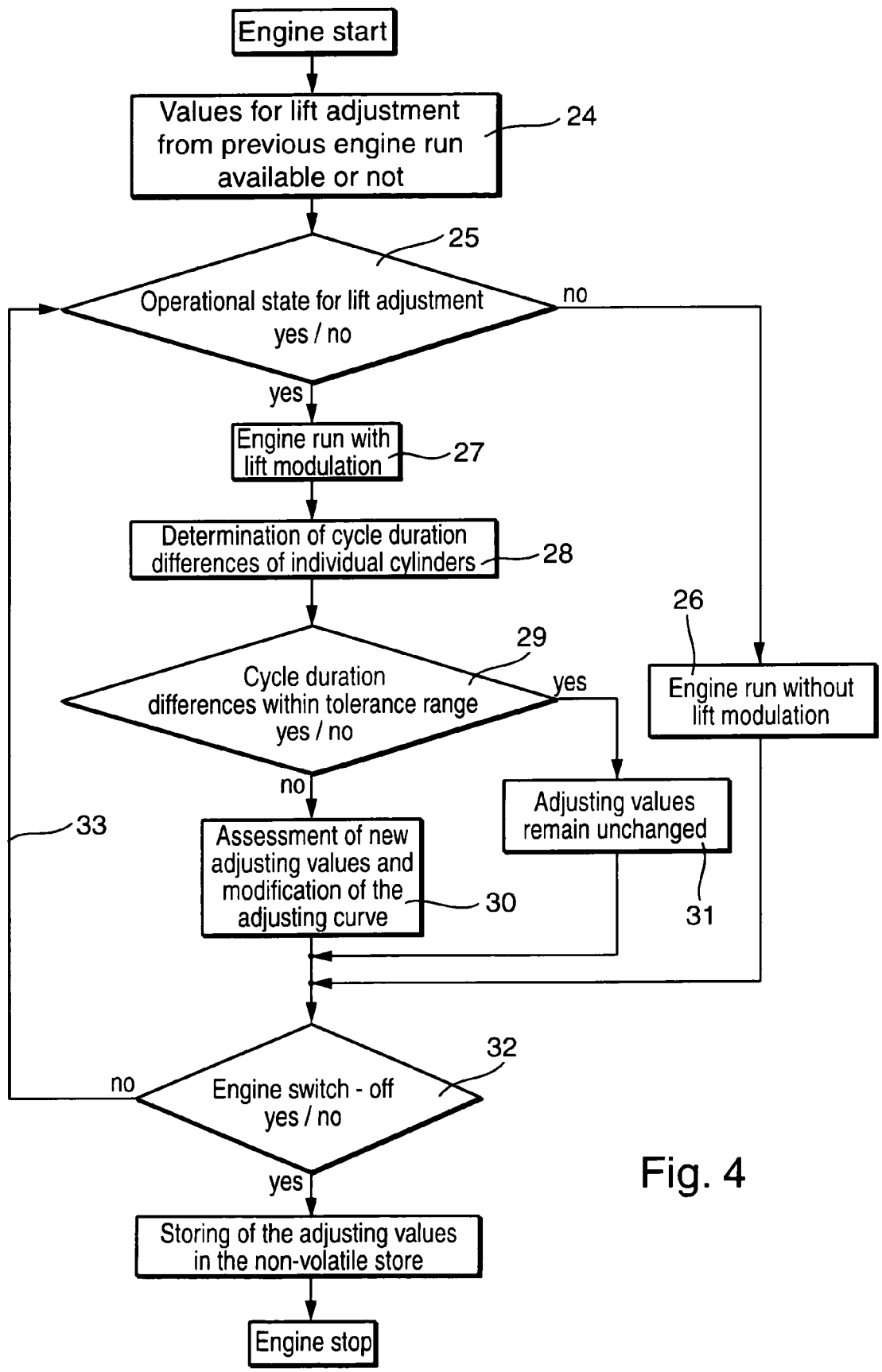
FIG. 4 is a program flow chart of the procedure of electromechanical tolerance compensation in the filling of the cylinders.

The flow chart shown in FIG. 4 only concerns the routine that controls the electromechanical tolerance compensation. Further functions of engine control units, for example, mixture preparation, evaluation of driver wishes, exhaust gas after-treatment etc. take place simultaneously and are not represented in the flow chart.

After the engine has been started, a procedure (Item 24) is used to verify whether compensation values for the electromechanical tolerance compensation (hereinafter referred to as "EMT") are available from preceding engine runs. If no such values exist, one starts with standard values, e.g. zero.

It is then verified whether the actual engine speed and operational state is within the range for EMT (Item 25). The internal combustion engine is run without EMT, for example, at engine speeds above a limit speed or in the overrun mode (with overrun fuel cut-off) (Item 26). If the range of operation is suitable, the adjusting curves are implemented by the actuator (Item 26). If this is not the case, no cylinder-specific valve lift modulation takes place (Item 27).

During the run with EMT, non-uniformities in operation between the individual cylinders are determined by the control device using suitable algorithms (Item 28). If these non-uniformities lie outside of a defined tolerance limit (Item 29), an adaptation of the adjusting values and a corresponding modification of the adjusting curve is effected (Item 30), and this curve is traced by the actuator during the next run through the loop. If the differences of cycle duration and filling lie within the tolerance limit, the values remain unchanged (path, see Item 31).

If the engine is turned off (Item 32), the compensation values for each cylinder are stored in a non-volatile store of the engine control device. If not, the loop is run through again (path, see Item 33).

REFERENCE NUMERALS

1 Adjusting shaft
2 Adjusting cam
3 Electromechanical actuator
4 Adjusting lever
5 Forked lever
6 Spindle drive
7 Electromotor
8 Spindle nut
9 Threaded spindle
10 Mounting pin
11 Other mounting pin
12 Electromotor shaft
13 Support bearing
14 Internal combustion engine
15 Control device
16 Transmitter
17 First electric line
18 Second electric line
19 Operative connection
20 Fully variable mechanical valve train
21 Device for equalizing filling
22 Adjusting curve
23 Line
24 to 33 Item of the flow chart

What is claimed is:

1. A method for equalizing the filling of the cylinders of a multi-cylinder internal combustion engine (14) comprising a fully variable mechanical valve train (20) having an adjusting shaft (1) that controls the valve lift of the inlet valves of a cylinder bank and can be rotated together with its rotationally fixed adjusting cam (2) by an electromechanical actuator (3), comprising measuring filling-dependent engine data by a sensor (16) while the engine (14) is running and processing with suitable software in a control device (15) into signals with which the actuator (3) rotates the adjusting shaft (1) selectively for each cylinder in keeping with the opening phase thereby regulating the lift and the time cross-section of the individual inlet valves and, as a consequence, also the filling of the individual cylinders to a desired set value.

2. A method of claim 1, wherein the torsional vibrations or the lambda value combined with the injected quantity or duration of injection of fuel or the signal of a knock sensor serve for judging the filling of the individual cylinders.

3. A method of claim 2, wherein adjusting curves (22) are generated in the control device (15) by appropriate software on the basis of differences in duration of the work cycles of the individual cylinders, and said adjusting curves (22) are traced by the actuator (3) selectively for each cylinder in keeping with the opening phase and enable, via the adjusting shaft (1), appropriate corrections of the time cross-sections of the individual inlet valves and thus of the filling of the individual cylinders.

4. The method of claim 3, wherein the equalization of the filling of the cylinders is performed in defined steps and over a large number of work steps till the deviations lie below a defined limit threshold value.

5. The method of claim 4, wherein the equalization of the filling-dependent differences in duration of the work cycles of the individual cylinders is effected using defined adjusting values that are stored in a characteristic diagram of the control device (15).

6. A method of claim 1, for equalizing the filling of the cylinders of a multi-cylinder internal combustion engine (14) comprising a fully variable mechanical valve train (20) having an adjusting shaft (1) that controls the valve lift of the inlet valves of a cylinder bank and can be rotated together with its rotationally fixed adjusting cam (2) by an electro-mechanical actuator (3), comprising measuring filling-dependent engine data by a sensor (16) while the engine (14) is running and processing with suitable software in a control device (15) into signals with which the actuator (3) rotates the adjusting shaft (1) selectively for each cylinder in keeping with the opening phase thereby regulating the lift and the time cross-section of the individual inlet valves and, as a consequence, also the filling of the individual cylinders to a desired set value wherein the last-used adjusting values are stored in a non-volatile store of the control device (15) when the engine (14) is turned off and are available at the next start of the engine.

7. The method of claim 6, wherein adjusting values for operational states like cold and hot starts and cold and hot operation of the engine (14) are stored in a characteristic diagram of the control device (15).

8. A device for equalizing the filling of the cylinders of a multi-cylinder internal combustion engine (14), for implementing the method of claim 1, said engine (14) comprising a fully variable mechanical valve train (20) having an adjusting shaft (1) that controls the valve lift of the inlet valves of a cylinder bank and can be rotated together with its rotationally fixed adjusting cams (2) by an electromechanical actuator (3), wherein said device comprises a control device (15) that is connected through a first electric line (17) to a transmitter (16) of signals of the internal combustion engine (14) that are relevant to the cylinder filling, and through a second electric line (18) to a driving motor (7) of the actuator (3).

* * * * *